US012401025B2

(12) United States Patent
Bae et al.

(10) Patent No.: US 12,401,025 B2
(45) Date of Patent: Aug. 26, 2025

(54) ANODE FOR SECONDARY BATTERY, SECONDARY BATTERY INCLUDING THE SAME

(71) Applicant: SK ON CO., LTD., Seoul (KR)

(72) Inventors: Ji Hee Bae, Daejeon (KR); Jae Ram Kim, Daejeon (KR); Jung Hwan Kim, Daejeon (KR); Jae Yun Min, Daejeon (KR); Sang Won Bae, Daejeon (KR); Myung Ro Lee, Daejeon (KR); Yong Seok Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 245 days.

(21) Appl. No.: 17/501,082

(22) Filed: Oct. 14, 2021

(65) Prior Publication Data

US 2022/0123289 A1 Apr. 21, 2022

(30) Foreign Application Priority Data

Oct. 15, 2020 (KR) .................. 10-2020-0133786

(51) Int. Cl.
*H01M 4/38* (2006.01)
*H01M 4/36* (2006.01)
*H01M 4/583* (2010.01)

(52) U.S. Cl.
CPC .......... *H01M 4/386* (2013.01); *H01M 4/366* (2013.01); *H01M 4/583* (2013.01)

(58) Field of Classification Search
CPC ...... H01M 4/366; H01M 4/386; H01M 4/583; H01M 4/663
USPC ..................... 429/209, 521, 231.8
See application file for complete search history.

(56) References Cited

U.S. PATENT DOCUMENTS

| | | | |
|---|---|---|---|
| 2010/0193731 A1 | 8/2010 | Lee et al. | |
| 2013/0164618 A1 | 6/2013 | Konishi | |
| 2015/0280221 A1 | 10/2015 | Abdelsalam et al. | |
| 2016/0329557 A1* | 11/2016 | Sugimori | H01M 4/483 |
| 2017/0352911 A1 | 12/2017 | Choi et al. | |
| 2018/0212277 A1 | 7/2018 | Park et al. | |
| 2019/0123352 A1 | 4/2019 | Ko et al. | |
| 2019/0198934 A1* | 6/2019 | Liu | H01M 4/139 |
| 2020/0243848 A1 | 7/2020 | Kim et al. | |

(Continued)

FOREIGN PATENT DOCUMENTS

| | | |
|---|---|---|
| CN | 103283067 A | 9/2013 |
| CN | 104885262 A | 9/2015 |

(Continued)

OTHER PUBLICATIONS

Yang et al., machine translation of CN 107946561, Apr. 20, 2018 (Year: 2018).*

(Continued)

*Primary Examiner* — Jonathan G Leong
*Assistant Examiner* — John S Medley
(74) *Attorney, Agent, or Firm* — The Webb Law Firm (57) ABSTRACT

The present invention provides an anode for a secondary battery, which includes an anode current collector and an anode active material layer which is formed on the anode current collector, and includes a silicon-based active material and a conductive material including single-walled carbon nanotubes. The single-walled carbon nanotube has a Raman R value (a D band peak intensity (Id)/a G band peak intensity (Ig)) of 0.01 to 0.1.

7 Claims, 1 Drawing Sheet

(56) References Cited

U.S. PATENT DOCUMENTS

| | | |
|---|---|---|
| 2020/0343541 A1 | 10/2020 | Yoo et al. |
| 2021/0151744 A1 | 5/2021 | Choi et al. |
| 2021/0391572 A1* | 12/2021 | Zeng .................. H01M 10/054 |
| 2022/0037643 A1* | 2/2022 | Iwami .................. H01M 4/587 |
| 2022/0209240 A1* | 6/2022 | Kim ..................... H01M 4/625 |

FOREIGN PATENT DOCUMENTS

| | | | |
|---|---|---|---|
| CN | 107946561 | * 4/2018 | ........ H01M 10/0525 |
| CN | 107946561 A | * 4/2018 | ........ H01M 10/0525 |
| CN | 108878771 A | * 11/2018 | ........ H01M 10/0525 |
| CN | 111587499 A | 8/2020 | |
| JP | 2020105316 A | 7/2020 | |
| KR | 1020100088353 A | 8/2010 | |
| KR | 1020150121694 A | 10/2015 | |
| KR | 1020160104827 A | 9/2016 | |
| KR | 1020160122937 A | 10/2016 | |
| KR | 1020170099748 A | 9/2017 | |
| KR | 1020190043957 A | 4/2019 | |
| KR | 1020190065172 A | 6/2019 | |
| KR | 1020200047286 A | 5/2020 | |
| KR | 1020200055448 A | 5/2020 | |
| KR | 1020210001708 A | 1/2021 | |
| WO | WO-2020066576 A1 | * 4/2020 | ........ H01M 10/0525 |
| WO | WO-2020177624 A1 | * 9/2020 | ........ H01M 10/0525 |
| WO | WO-2020262890 A1 | * 12/2020 | ......... H01M 10/052 |
| WO | WO-2021155503 A1 | * 8/2021 | ............ H01M 4/133 |

OTHER PUBLICATIONS

Huang et al., machine translation of WO 2021155503, Aug. 12, 2021 (Year: 2021).*

* cited by examiner

ANODE FOR SECONDARY BATTERY, SECONDARY BATTERY INCLUDING THE SAME

CROSS-REFERENCE TO RELATED APPLICATION

This application claims priority to Korean Patent Application No. 10-2020-0133786 filed Oct. 15, 2020, the disclosure of which is hereby incorporated by reference in its entirety.

BACKGROUND OF THE INVENTION

1. Field of the Invention

The present invention relates to an anode for a secondary battery and a secondary battery including the same, and more specifically, to an anode for a secondary battery which includes a silicon-based anode active material and a secondary battery including the same.

2. Description of the Related Art

A secondary battery is a battery that can be repeatedly charged and discharged, and is widely applied to portable electronic communication devices such as camcorders, mobile phones, and notebook PCs with the development of information communication and display industries. Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight. In this regard, the lithium secondary battery has been actively developed and applied as a power source.

The lithium secondary battery may include an electrode assembly including a cathode, an anode, and a separation membrane (separator); and an electrolyte in which the electrode assembly is impregnated. The lithium secondary battery may further include, for example, a pouch-shaped outer case in which the electrode assembly and the electrolyte are housed.

Recently, as an application field of the lithium secondary battery has been extended from a small electronic device to a large device such as a hybrid vehicle, sufficient capacity and output characteristics may not be implemented through the existing lithium secondary battery.

For example, in the case of an electric vehicle (EV) driven only by a battery, there is a limitation in securing sufficient driving time as the existing secondary battery due to large power consumption rate and amount.

Accordingly, a development of a lithium secondary battery capable of securing high rate and high capacity characteristics is required.

For example, Korean Patent Laid-Open Publication No. 2017-0099748 discloses an electrode assembly for a lithium secondary battery and a lithium secondary battery including the same, but there is a limitation in securing sufficient high rate and high capacity characteristics.

PRIOR ART DOCUMENT

[Patent Document]

Korean Patent Laid-Open Publication No. 10-2017-0099748

SUMMARY OF THE INVENTION

An object of the present invention is to provide an anode for a secondary battery having stable electrical characteristics.

Another object of the present invention is to provide a secondary battery including the anode having stable electrical characteristics.

To achieve the above objects, according to an aspect of the present invention, there is provided an anode for a secondary battery including: an anode current collector; and an anode active material layer which is formed on the anode current collector, and includes a silicon-based active material and a conductive material including a single-walled carbon nanotube, wherein the single-walled carbon nanotube has a Raman R value (a D band peak intensity (Id)/a G band peak intensity (Ig)) of 0.01 to 0.1.

In exemplary embodiments, a content of the silicon-based active material may be 5% by weight or more based on a total weight of the anode active material layer.

In exemplary embodiments, a content of the single-walled carbon nanotube may be 0.02 to 0.2% by weight based on the total weight of the anode active material layer.

In exemplary embodiments, the single-walled carbon nanotube may have a length of 5 µm or more.

In exemplary embodiments, the single-walled carbon nanotube may have a diameter of 1.2 to 2 nm.

In exemplary embodiments, the anode active material layer may include: a first anode active material layer which is formed on the anode current collector, and includes a first silicon-based active material and a first conductive material including the single-walled carbon nanotube; and a second anode active material layer which is formed on the first anode active material layer, and includes a second silicon-based active material and a second conductive material including a multi-wall carbon nanotube.

In exemplary embodiments, a content of the first silicon-based active material based on a total weight of the first anode active material layer may be larger than a content of the second silicon-based active material based on a total weight of the second anode active material layer.

In exemplary embodiments, the content of the first silicon-based active material may be 5% by weight or more based on the total weight of the first anode active material layer, and the content of the second silicon-based active material may be less than 5% by weight based on the total weight of the second anode active material layer.

In exemplary embodiments, the content of the single-walled carbon nanotube may be 0.02 to 0.2% by weight based on the total weight of the first anode active material layer, and the content of the multi-walled carbon nanotube may be 0.2 to 0.5% by weight based on the total weight of the second anode active material layer.

According to another aspect of the present invention, there is provided a secondary battery including: the anode for a secondary battery; a cathode; and a separation membrane disposed between the anode and the cathode.

According to an embodiment of the present invention, the anode active material layer may include the silicon-based active material and the single-walled carbon nanotube having a Raman R value within a specific range. In this case, if an electrical short-circuit occurs in the anode due to swelling of the anode during charging and discharging the battery by including the silicon-based active material, an increase in the resistance due to the electrical short-circuit may be minimized by the single-walled carbon nanotube. Thereby, life-span characteristics of the secondary battery may be improved by effectively preventing heat generation due to the increased resistance.

According to an embodiment of the present invention, the anode may include the first anode active material layer including the single-walled carbon nanotube and the second anode active material layer including the multi-walled carbon nanotube. In this case, an increase in a resistance of the anode may be effectively prevented by the first anode active material layer including the single-walled carbon nanotube, and the interface resistance may be reduced by the second anode active material layer including the multi-walled carbon nanotube. Thereby, electrochemical safety of the secondary battery may be more improved.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE INVENTION

Hereinafter, exemplary embodiments of the present invention will be described in detail with reference to the accompanying drawings. However, these embodiments are merely an example, and the present invention is not limited to the specific embodiments described as the example.

Figure 1:
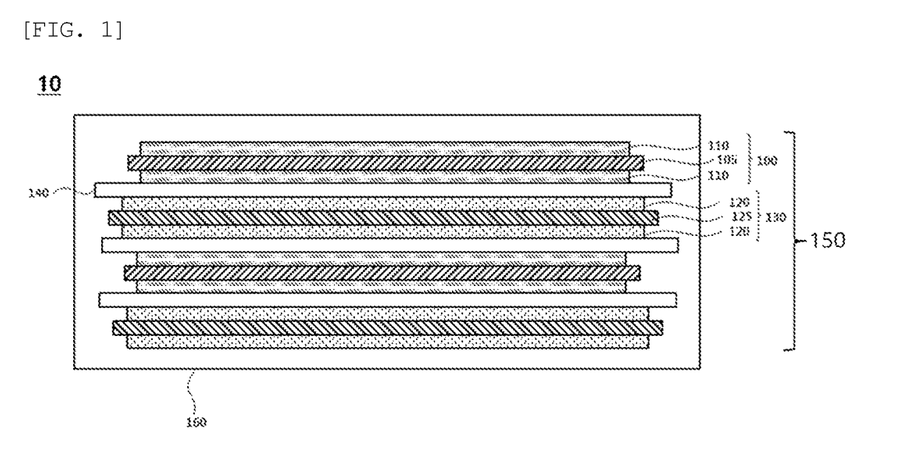
FIG. 1 is a schematic cross-sectional view illustrating a secondary battery according to an embodiment of the present invention.
Figure 2:
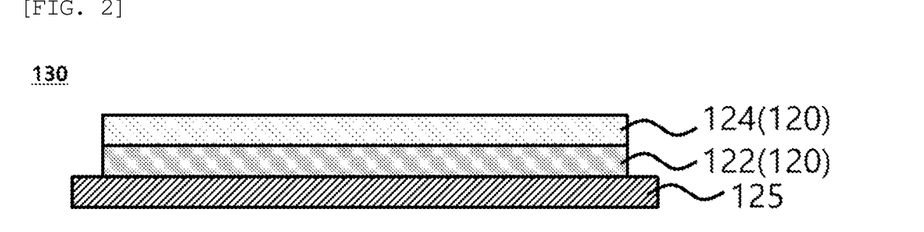
FIG. 2 is a schematic cross-sectional view illustrating an anode for a secondary battery according to another embodiment of the present invention.

FIG. 1 is a schematic cross-sectional view illustrating a secondary battery according to an embodiment of the present invention, and FIG. 2 is a schematic cross-sectional view illustrating an anode for a secondary battery according to another embodiment of the present invention.

Referring to FIG. 1, a lithium secondary battery 10 may include an electrode assembly 150 and a case 160 in which the electrode assembly 150 is housed.

The electrode assembly 150 may include a cathode 100, an anode 130, and a separation membrane 140 interposed between the cathode 100 and the anode 130.

The cathode 100 may include a cathode current collector 105, and a cathode active material layer 110 disposed on at least one surface of the cathode current collector 105 and including a cathode active material.

The cathode active material may include a compound capable of reversibly intercalating and deintercalating lithium ions.

In one embodiment, the cathode active material layers 110 may be formed on both surfaces (e.g., upper and lower surfaces) of the cathode current collector 105. For example, the cathode active material layers 110 may be coated on the upper and lower surfaces of the cathode current collector 105, respectively, and may be directly coated on the surfaces of the cathode current collector 105.

The cathode 100 may be prepared by coating the cathode current collector 105 with a cathode slurry, followed by drying and rolling (or pressing) the same. The cathode slurry may be prepared by mixing the cathode active material with a binder, a conductive material and/or a dispersant in a solvent, followed by stirring the same.

The cathode current collector 105 may include a metal material which has no reactivity in a charging/discharging voltage range of the secondary battery 10 and facilitates application and adhesion of the electrode active material. For example, the cathode current collector 105 may include stainless steel, nickel, aluminum, titanium, copper, zinc, or an alloy thereof, and preferably includes aluminum or an aluminum alloy.

The cathode active material layer 110 may include a lithium metal oxide as the cathode active material. For example the cathode active material may include a lithium-transition metal composite oxide particle.

In some embodiments, the cathode active material may include a lithium (Li)-nickel (Ni)-based oxide. For example, the lithium-transition metal composite oxide particle may include nickel, and may further include at least one of cobalt (Co) and manganese (Mn).

In some embodiments, the cathode active material or the lithium-transition metal composite oxide particle may further include a coating element or doping element. For example, the coating element or doping element may include Al, Ti, Ba, Zr, Si, B, Mg, P, Sr, W, La, or an alloy thereof or an oxide thereof. These may be used alone or in combination of two or more thereof. The cathode active material or the lithium-transition metal composite oxide particle is passivated by the coating or doping element, thereby stability and life-span for penetration of an external object may be more improved.

In some embodiments, the lithium-transition metal composite oxide particles may be represented by Formula 1 below.

$$Li_xNi_{1-y}M_yO_{2+z} \qquad \text{[Formula 1]}$$

In Formula 1, x and y may be in a range of $0.9 \leq x \leq 1.2$, and $0 \leq y \leq 0.7$, and z may be in a range of $-0.1 \leq z \leq 0.1$. M may denote at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn and Zr.

For example, nickel (Ni) may be provided as a metal associated with a capacity of the lithium secondary battery. The higher the content of nickel, the better the capacity and output of the lithium secondary battery. However, if the content of nickel is excessively increased, the life-span may be reduced, and it may be disadvantageous in terms of mechanical and electrical stabilities. For example, cobalt (Co) may be metal associated with a conductivity or resistance of the lithium secondary battery. In one embodiment, M includes manganese (Mn), and Mn may be provided as metal associated with the mechanical and electrical stabilities of the lithium secondary battery. Through an interaction between the above-described nickel, cobalt and manganese, capacity, output, low resistance, and life-span stability from the cathode active material layer 110 may be improved together.

In some embodiments, a content of nickel in the cathode active material may be 80 mol % or more, and preferably 85 mol % or more based on a total number of moles of transition metal atoms. Accordingly, it is possible to implement a high capacity, high output lithium secondary battery.

For example, a cathode slurry may be prepared by mixing the cathode active material with a binder, a conductive material and/or a dispersant in a solvent, followed by stirring the same. The cathode slurry may be coated on the cathode current collector 105, followed by compressing and drying to prepare the cathode active material layer 110.

The binder may include, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a binder for forming the cathode. In this case, an amount of the binder for forming the cathode active material layer may be reduced, thereby improving the output and capacity of the secondary battery.

The conductive material may be included to facilitate electron transfer between the active material particles. For example, the conductive material may include a carbon-based conductive material such as graphite, carbon black, graphene, or carbon nanotube and/or a metal-based conductive material such as tin, tin oxide, titanium oxide, or a perovskite material such as $LaSrCoO_3$, and $LaSrMnO_3$, etc.

In some embodiments, the electrode of the cathode 100 may have a density of 3.0 to 3.9 g/cc, and preferably 3.2 to 3.8 g/cc.

According to exemplary embodiments, the cathode active material layer 110 may have a multilayer structure.

Referring to FIGS. 1 and 2, the anode 130 may include an anode current collector 125 and an anode active material layer 120 formed on at least one surface of the anode current collector 125. According to exemplary embodiments, the anode active material layers 120 may be formed on both surfaces (e.g., upper and lower surfaces) of the anode current collector 125. The anode active material layers 120 may be coated on the upper and lower surfaces of the anode current collector 125, respectively. For example, the anode active material layers 120 may come into direct contact with the surfaces of the anode current collector 125.

The anode current collector 125 may include, for example, gold, stainless steel, nickel, aluminum, titanium, copper, or an alloy thereof, and preferably includes copper or a copper alloy.

In one embodiment, the anode active material layer 120 may include an anode active material capable of intercalating and deintercalating lithium ions, a conductive material and a binder. The anode active material may include a silicon-based active material, and the conductive material may include a single-walled carbon nanotube.

In one embodiment, the single-walled carbon nanotube may have a Raman R value of about 0.01 to 0.1. The Raman R value may be defined as a peak intensity ratio (Id/Ig), which is represented by measuring a peak intensity (Ig) near a G band (about 1,580 cm-1) and a peak intensity (Id) near a D band (about 1,350 cm-1) in Raman spectrum analysis.

When the single-walled carbon nanotube satisfies the above Raman R value range, the anode active material layer 120 including the single-walled carbon nanotube has fewer defects in the structure and a high degree of crystallinity, such that electrical conductivity may be further improved. In addition, when the single-walled carbon nanotube satisfies a length and a diameter to be described below, the above-described effects may be more enhanced, such that a secondary battery having excellent electrochemical properties may be implemented.

In some embodiments, the single-walled carbon nanotube may have a length of 5 μm or more, 20 μm or more, or 50 μm or more. In this case, a conductive material network by the single-walled carbon nanotube may be easily formed, and an increase in the resistance caused by the electrical short-circuit may be more effectively prevented. Thereby, it is possible to implement a secondary battery having excellent electrochemical properties.

In some embodiments, the single-walled carbon nanotube may have a length of 200 μm or less, or 100 μm or less. When the length thereof satisfies the above range, aggregation of the single-walled carbon nanotube in the anode slurry may be prevented, and better dispersing power may be secured. However, it is not necessarily limited thereto, and an upper limit of the length of the single-walled carbon nanotube may be appropriately adjusted according to types of the anode active material, the binder, and a dispersion medium, which are mixed during preparation of the anode slurry.

In some embodiments, a content of the single-walled carbon nanotube may be about 0.02 to 0.2 wt. % based on a total weight of the anode active material layer 120. More preferably, the content of the single-walled carbon nanotube may be about 0.05 to 0.15 wt % based on the total weight of the anode active material layer 120.

For example, when the content of the single-walled carbon nanotube satisfies the above range, an increase in the resistance caused by including the silicon-based active material in a large amount may be effectively prevented, and thus, life-span characteristics of the secondary battery may be more improved.

In one embodiment, the single-walled carbon nanotube may have a diameter of 0.5 to 10 nm, preferably 1 to 5 nm, and more preferably 1.2 to 2 nm. In this case, it is possible to more effectively prevent an increase in the resistance caused by including the silicon-based active material in a large amount.

In one embodiment, as the conductive material, materials substantially the same as or similar to those used for forming the cathode 100 may be further included.

The silicon-based active material may include SiOx (0<x<2) or SiOx containing a lithium compound (0<x<2). The SiOx containing the Li compound may be SiOx containing lithium silicate. The lithium silicate may be present in at least a portion of SiOx (0<x<2) particles, for example, may be present inside and/or on a surface of the SiOx (0<x<2) particles. In one embodiment, the lithium silicate may include $Li_2SiO_3$, $Li_2Si_2O_5$, $Li_4SiO_4$, $Li_4Si_3O_8$ and the like.

The silicon-based active material may further include a silicon-carbon composite compound such as silicon carbide (SiC), a silicon oxide-carbon composite, or a silicon-silicon oxide-carbon composite.

In one embodiment, a content of the silicon-based active material may be 5% by weight ('wt. %') or more based on the total weight of the anode active material layer. For example, the content of the silicon-based active material may be 5 wt. % to 40 wt. % based on the total weight of the anode active material layer. When the content of the silicon-based active material satisfies the above range, output and capacity of the lithium ion battery may be further improved, and a high energy cell may be more easily implemented.

For example, during charging and discharging the battery, swelling of the silicon-based active material is increased due to repeated deintercalation and intercalation of lithium ions, such that an electrical short-circuit between the anode active materials occurs, and thereby stability of the battery may be reduced. However, in the case of the present invention, the increase in the resistance due to the electrical short-circuit may be effectively reduced by the stable conductive material network formed by the single-walled carbon nanotube, and the life-span characteristics of the battery may be more improved.

In one embodiment, the anode active material may further include at least one of a carbon-based active material and a lithium composite active material.

The carbon-based active material may include a graphite-based active material and a non-graphite-based active material. The graphite-based active material may include at least one of natural graphite and artificial graphite.

The non-graphite-based active material may include at least one of hard and soft carbons, carbon nanotube, carbon fibers, coke, and pitch.

For example, synthetic graphite and hard carbon may include primary and/or secondary particle forms.

The artificial graphite has relatively superior life-span characteristics compared to the natural graphite, and since the natural graphite has a larger specific surface area than that of the artificial graphite, it has a relatively low resistance, which may be advantageous in terms of output improvement. For example, the artificial graphite and the natural graphite may be mixed and used.

In one embodiment, the carbon-based material may include the non-graphite-based active material or minute carbon particles. The minute carbon particles may include carbon black, Super P and the like. The high-rate characteristics of the anode active material may be improved by the carbon-based material.

In one embodiment, an anode slurry may be prepared by mixing and stirring the anode active material with a binder, a conductive material and/or a dispersant in a solvent. The anode slurry may be applied (coated) to the anode current collector 125, followed by compressing and drying to prepare the anode active material layer 120.

Materials substantially the same as or similar to those used for forming the cathode 100 may be used as the binder for forming the anode.

In some embodiments, the binder for forming the anode 130 may include, for example, styrene-butadiene rubber (SBR) or an acrylic binder for consistency with the carbon-based active material, and may be used together with a thickener such as carboxymethyl cellulose (CMC).

In one embodiment, the anode active material layer 120 may have a density of 1.4 to 1.9 g/cc.

In some embodiments, the anode 130 may have an area (e.g., a contact area with the separation membrane 140) and/or volume larger than those/that of the cathode 100. Thereby, lithium ions generated from the cathode 100 may smoothly move to the anode 130 without being precipitated in the middle, such that output and capacity characteristics may be further improved.

Referring to FIG. 2, the anode active material layer 120 may have a multilayer structure.

In one embodiment, the anode active material layer 120 may include a first anode active material layer 122 which is formed on the anode current collector 125, and includes a first silicon-based active material and a first conductive material including single-walled carbon nanotube, and a second anode active material layer 124 which is formed on the first anode active material layer 122, and includes a second silicon-based active material and a second conductive material including multi-wall carbon nanotube.

For example, when the anode active material layer 120 includes the first anode active material layer 122 and the second anode active material layer 124 including different types of carbon nanotube, an increase in the resistance of the anode 130 due to repeated charging may be effectively prevented by the single-walled carbon nanotube included in the first anode active material layer 122, and an interfacial resistance between the separation membrane 140 and the anode 130 may be reduced by the multi-walled carbon nanotube included in the second anode active material layer 124. Accordingly, the internal resistance of the secondary battery may be reduced, such that rapid charging characteristics and stability may be further improved.

In some exemplary embodiments, the content of the first silicon-based active material based on the total weight of the first anode active material layer 122 may be larger than the content of the second silicon-based active material based on the total weight of the second anode active material layer 124.

According to some exemplary embodiments, the content of the first silicon-based active material may be 5 wt. % or more based on the total weight of the first anode active material layer 122, and the content of the second silicon-based active material may be less than 5 wt. % based on the total weight of the second anode active material layer 124.

For example, when the content ranges of the first silicon-based active material and the second silicon-based active material satisfy the above conditions or the above ranges, as the content of the first silicon-based active material is increased, even if swelling of the first anode active material layer 122 is increased, it is possible to effectively prevent an increase in the resistance due to the electrical short-circuit by the single-walled carbon nanotube included in the first anode active material layer 122.

In addition, since the content of the second silicon-based active material included in the second anode active material layer 124 is less than the content of the first silicon-based active material, electrical short-circuit due to swelling of the second anode active material layer 124 may be effectively prevented even when including the multi-wall carbon nanotube, and the interfacial resistance with the separation membrane 140 may be reduced by the multi-walled carbon nanotube.

In one embodiment, the content of the single-walled carbon nanotube may be 0.02 to 0.2 wt. % based on the total weight of the first anode active material layer 122, and the content of the multi-walled carbon nanotube may be 0.2 to 0.5 wt. % based on the second anode active material layer 124.

When the contents of the single-walled carbon nanotube and the multi-walled carbon nanotube satisfy the above ranges, an increase in the resistance due to swelling of the anode 130 and an increase in the interface resistance between the anode 130 and the separation membrane 140 are prevented, such that the rapid charging characteristics and life-span characteristics of the secondary battery may be further improved.

In one embodiment, the same length and diameter of the single-walled carbon nanotube as described above may be applied thereto as they are.

In one embodiment, the multi-walled carbon nanotube may have a length of 1 to 100 μm, and more preferably 10 to 50 μm.

In one embodiment, the multi-walled carbon nanotube may have a length of 5 to 50 nm, preferably 5 to 20 nm, and more preferably 8 to 17 nm.

When the length and diameter of the multi-walled carbon nanotube satisfy the above ranges, an increase in the interfacial resistance with the separation membrane 140 may be more effectively prevented.

In some embodiments, the length of the single-walled carbon nanotube may be greater than the length of the multi-walled carbon nanotube. In this case, the electrochemical properties of the secondary battery may be more stably secured.

In one embodiment, the first anode active material layer 122 may be prepared by coating the anode current collector 125 with the first anode slurry which includes the first silicon-based active material, the first conductive material including the single-walled carbon nanotube, a binder, and a solvent, followed by drying and rolling the same. In addition, the second anode active material layer 124 may be prepared by coating the first anode active material layer 122 with the second anode slurry which includes the second silicon-based active material, the second conductive material including the multi-walled carbon nanotube, a binder, and a solvent, followed by drying and rolling the same.

In one embodiment, the first anode slurry is applied to the anode current collector 125, and the second anode slurry may be further applied to the applied first anode slurry, and then the applied first anode slurry and the second anode slurry may be dried and rolled to prepare the first anode active material layer 122 and the second anode active material layer 124.

In some embodiments, a loading weight ratio of the second anode slurry to the first anode slurry may be 0.25 to 1.25, and preferably 0.5 to 1.

Referring to FIG. 1, the separation membrane 140 may be interposed between the cathode 100 and the anode 130. The separation membrane 140 may include a porous polymer film made of a polyolefin polymer such as ethylene homopolymer, propylene homopolymer, ethylene/butene copolymer, ethylene/hexene copolymer, ethylene/methacrylate copolymer.

The separation membrane 140 may include a nonwoven fabric made of glass fiber having a high melting point, polyethylene terephthalate fiber or the like.

The separation membrane 140 may extend in the second direction between the cathode 100 and the anode 130, and may be folded and wound in a thickness direction of the lithium secondary battery. A plurality of cathodes 100 and anodes 130 may be laminated in the thickness direction with the separation membrane 140 interposed therebetween.

An electrode cell is formed by the cathode 100, the anode 130, and the separation membrane 140, and a plurality of electrode cells are laminated to form the electrode assembly 150, for example. The electrode assembly 150 may be formed by winding, laminating, or folding (e.g., z-folding), etc. the separation membrane 140.

The electrode assembly 150 is housed in the case 160, and an electrolyte may be injected into the case 160 together. The case 160 may include a shape of, for example, a pouch, a can or the like.

According to exemplary embodiments, a non-aqueous electrolyte may be used as the electrolyte.

The non-aqueous electrolyte includes a lithium salt of an electrolyte and an organic solvent, and the lithium salt is represented by, for example, $Li^+X^-$, and as an anion (X−) of the lithium salt, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, etc. may be exemplified.

As the organic solvent, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane, and the like may be used. These compounds may be used alone or in combination of two or more thereof.

Electrode tabs (a cathode tab and an anode tab) protrude from the cathode current collector 105 and the anode current collector 125, respectively, which belong to each electrode cell, and may extend to one side of the case 160. The electrode tabs may be fused together with the one side of the outer case 160 to form electrode leads (a cathode lead and an anode lead) extending or exposed to an outside of the outer case 160.

The cathode lead and the anode lead may be formed on the same side of the lithium secondary battery or the case 160, or may be formed on sides opposite to each other.

For example, the cathode lead may be formed on one end of the case 160, and the anode lead may be formed on the other end of the case 160 facing the one end.

The lithium secondary battery may be manufactured, for example, in a cylindrical shape using a can, a square shape, a pouch shape or a coin shape.

Hereinafter, specific experimental examples are proposed to facilitate understanding of the present invention. However, the following examples are only given for illustrating the present invention and those skilled in the art will obviously understand that various alterations and modifications are possible within the scope and spirit of the present invention. Such alterations and modifications are duly included in the appended claims.

Examples 1 to 6 and Comparative Examples 1 to 3

(1) Preparation of Cathode

A cathode slurry was prepared by mixing $Li[Ni_{0.88}Co_{0.09}Mn_{0.03}]O_2$ as a cathode active material, carbon black as a conductive material, and polyvinylidene fluoride (PVdF) as a binder in a weight ratio of 98.5:0.5:1.

The prepared cathode slurry was uniformly applied to an aluminum foil, followed by performing drying and rolling processes to prepare a cathode.

(2) Preparation of Anode

An anode active material, a conductive material and a binder were mixed according to the composition and weight ratio of Table 1 below, and dispersed in water to prepare an anode slurry.

As the conductive material, a single-walled carbon nanotube (OCSiAl Co., SW-CNT, having a length of more than 5 μm and a diameter of 1.2 to 2 nm), or a multi-wall carbon nanotube (MW-CNT, having a length of 10 to 50 μm and a diameter of 8 to 17 nm) were used.

Raman R values of SW-CNT and MW-CNT shown in Table 1 below mean a peak intensity ratio (Id/Ig) represented by measuring a G band (about 1,580 cm-1) peak intensity (Ig) and a D band (about 1,350 cm-1) peak intensity (Id) in Raman spectrum analysis. The Raman R values were measured using Renishaw's inVia.

The anode slurry was applied to a copper thin film (thickness: 6 μm), followed by drying and rolling to have a density of 1.7 g/cc, thus to prepare an anode having a thickness of 133 μm.

TABLE 1

| Section | Conductive material | | Anode active material | | Binder SBR/CMC (1.5:1.3 weight ratio) content (wt. %) |
|---|---|---|---|---|---|
| | Type | R value | Content (wt. %) | Content (wt. %) of artificial graphite | Content (wt. %) of SiOx (0 < x < 2) |

| Section | Type | R value | Content (wt. %) | of artificial graphite | of SiOx (0 < x < 2) | content (wt. %) |
|---|---|---|---|---|---|---|
| Example 1 | SW-CNT | 0.03 | 0.1 | 91.1 | 6 | 2.8 |
| Example 2 | SW-CNT | 0.02 | 0.02 | 91.18 | 6 | 2.8 |
| Example 3 | SW-CNT | 0.03 | 0.2 | 91.0 | 6 | 2.8 |
| Example 4 | SW-CNT | 0.03 | 0.01 | 91.19 | 6 | 2.8 |
| Example 5 | SW-CNT | 0.03 | 0.21 | 90.99 | 6 | 2.8 |
| Example 6 | SW-CNT | 0.1 | 0.1 | 91.1 | 6 | 2.8 |
| Comparative Example 1 | MW-CNT | 1.1 | 0.5 | 90.7 | 6 | 2.8 |
| Comparative Example 2 | SW-CNT | 0.2 | 0.1 | 91.1 | 6 | 2.8 |
| Comparative Example 3 | MW-CNT | 1.1 | 0.5 | 97.50 | — | 2.8 |

(3) Manufacture of Secondary Battery

The cathode and the anode were disposed with a polyethylene (PE) separation membrane (13 μm) interposed therebetween to form an electrode cell, and the electrode cells were laminated to prepare an electrode assembly. The electrode assembly 150 was housed in a pouch and electrode tab parts were fused. Thereafter, an electrolyte was injected, and then sealed to manufacture a secondary battery.

After preparing a 1M LiPF6 solution with a mixed solvent of ethylene carbonate/ethylmethyl carbonate/diethyl carbonate (EC/EMC/DEC, 25/45/30; volume ratio), 1 wt. % of vinylene carbonate (VC) based on a total weight of the electrolyte, 0.5 wt. % of 1,3-propensultone (PRS) and 0.5 wt. % of lithium bis(oxalato)borate (LiBOB) were added thereto to use as the electrolyte solution.

Examples 7 to 10

Artificial graphite, SiOx (0<x<2), the single-walled carbon nanotube (SW-CNT), and the SBR/CMC were mixed in a weight ratio of 89.1:8:0.1:2.8, and dispersed in water to prepare a first anode slurry.

Then, an anode active material, a conductive material and a binder were mixed according to the composition and weight ratio of Table 2 below, and dispersed in water to prepare a second anode slurry.

The first anode slurry was applied to a copper thin film (thickness: 6 μm), and then a second anode slurry was further applied to the applied first anode slurry. A loading weight ratio of the first anode slurry and the second anode slurry was 1:1.

Thereafter, the applied first anode slurry and the second anode slurry were dried, and then rolled to have a density of 1.7 g/cc, thus to prepare an anode having a thickness of 133 μm.

TABLE 2

| Section | Conductive material | | Anode active material | | Binder SBR/CMC (1.5:1.3 weight ratio) content (wt. %) |
|---|---|---|---|---|---|
| | Type | R value | Content (wt. %) | Content (wt. %) of artificial graphite | Content (wt. %) of SiOx (0 < x < 2) |

| Section | Type | R value | Content (wt. %) | of artificial graphite | of SiOx (0 < x < 2) | content (wt. %) |
|---|---|---|---|---|---|---|
| Example 7 | MW-CNT | 1.1 | 0.5 | 92.7 | 4 | 2.8 |
| Example 8 | MW-CNT | 1.1 | 0.2 | 93.0 | 4 | 2.8 |
| Example 9 | MW-CNT | 1.1 | 0.1 | 93.1 | 4 | 2.8 |
| Example 10 | SW-CNT | 0.03 | 0.1 | 93.1 | 4 | 2.8 |

Experimental Example (1) Electrode Resistance (ΩCm)

Electrode resistances (Ωcm) of the anodes of the examples and the comparative examples were measured.

A hioki XF057 Probe unit was used as a measurement equipment, and measurement conditions were a range of 100 uA current and 0.5V voltage, and the number of pin contacts was 500.

(2) Evaluation of Rapid Cycle at Room Temperature

The lithium secondary batteries according to the examples and the comparative examples were repeatedly subjected to charging/discharging cycles 200 times with step-by-step current values (2C, 1.75C, 1.5C, 1.25C, 1C, 0.75C, and 0.5C) at an interval of 0.25C from 2C to 0.5C at room temperature (25° C.), by charging under 4.2V cut-off conditions, followed by leaving for 10 minutes, and discharging with constant current of 0.5C under 2.5V cut-off conditions, followed by leaving for 10 minutes.

A percentage value (A2/A1×100%) of a discharge capacity A2 measured after performing the charging/discharging cycle 200 times to a discharge capacity A1 measured after performing the charging/discharging cycle once was calculated, and results thereof are shown in Table 3 below.

(3) Evaluation of Cycle at High Temperature (45° C.)

The lithium secondary batteries of the examples and the comparative examples were repeatedly subjected to charging/discharging cycles 200 times by charging with constant current of 0.3C under 4.2V and 0.05C cut-off conditions, followed by leaving for 10 minutes, and discharging with constant current of 0.5C under 2.5V cut-off conditions, followed by leaving for 10 minutes.

A percentage value (B2/B1×100%) of a discharge capacity B2 measured after performing the charging/discharging cycle 200 times to a discharge capacity B1 measured after performing the charging/discharging cycle once was calculated, and results thereof are shown in in Table 3 below.

(4) Evaluation of Storage at High Temperature (60° C.)

The lithium secondary batteries of the examples and the comparative examples were charged to SOC (state of charge) 100% with constant current of 0.3C under 4.2V and 0.05C cut-off conditions, and then stored at a high temperature of 60° C. for 8 weeks.

A percentage value (C2/C1×100%) of a discharge capacity C2 measured after storage at high temperature to a discharge capacity C1 measured before storage at high temperature was calculated, and results thereof are shown in Table 3 below.

TABLE 3

| Section | Electrode resistance (Ωcm) | Evaluated rapid cycle (%) at room temperature (25° C.) | Evaluated cycle (%) at high temperature (45° C.) | Evaluated storage (%) at high temperature (60° C., 8 weeks) |
|---|---|---|---|---|
| Example 1 | 0.030 | 87 | 95 | 96 |
| Example 2 | 0.031 | 84 | 93 | 93 |
| Example 3 | 0.034 | 86 | 96 | 97 |
| Example 4 | 0.058 | 81 | 88 | 85 |
| Example 5 | 0.047 | 80 | 91 | 82 |
| Example 6 | 0.065 | 81 | 90 | 89 |
| Example 7 | 0.040 | 94 | 93 | 95 |
| Example 8 | 0.038 | 92 | 94 | 93 |
| Example 9 | 0.032 | 93 | 93 | 92 |
| Example 10 | 0.036 | 87 | 94 | 95 |
| Comparative Example 1 | 0.078 | 79 | 86 | 90 |
| Comparative Example 2 | 0.052 | 80 | 84 | 88 |
| Comparative Example 3 | 0.043 | 76 | 92 | 94 |

Referring to Table 3 above, it can be confirmed that the lithium secondary batteries according to the examples exhibit excellent effects in rapid cycle characteristics at room temperature, cycle characteristics at high temperature, and storage characteristics at high temperature.

DESCRIPTION OF REFERENCE NUMERALS

100: Cathode
105: Cathode current collector
110: Cathode active material layer
130: Anode
125: Anode current collector
120: Anode active material layer
122: First anode active material layer
124: Second anode active material layer
140: Separation membrane
150: Electrode assembly
160: Case

What is claimed is:

1. An anode for a secondary battery comprising:
   an anode current collector; and
   an anode active material layer which is formed on the anode current collector,
   wherein the anode active material layer comprises a first anode active material layer which is formed on the anode current collector and includes a first silicon-based active material and single-walled carbon nanotubes; and
   a second anode active material layer which is formed on the first anode active material layer and includes a second silicon-based active material and carbon nanotubes,
   wherein a content of the first silicon-based active material based on a total weight of the first anode active material layer is larger than a content of the second silicon-based active material based on a total weight of the second anode active material layer,
   wherein the single-walled carbon nanotubes have a Raman R value of 0.01 to 0.1, wherein the Raman R value is a ratio of a D band peak intensity (Id) to a G band peak intensity (Ig),
   wherein a content of the single-walled carbon nanotubes in the first anode active material layer is 0.02 to 0.2% by weight based on the total weight of the first anode active material layer,
   wherein a content of the carbon nanotubes in the second anode active material layer based on the total weight of the second anode active material layer is equal to or larger than the content of the single-walled carbon nanotubes in the first anode active material layer based on the total weight of the first anode active material layer,
   wherein the carbon nanotubes of the first anode active material layer are only single-walled carbon nanotubes, and
   wherein the carbon nanotubes of the second anode active material layer are only multi-walled carbon nanotubes.

2. The anode for the secondary battery according to claim 1, wherein a total content of the first silicon-based active material and the second silicon-based active material is 5% by weight or more based on a total weight of the anode active material layer.

3. The anode for secondary battery according to claim 1, wherein each of the single-walled carbon nanotubes has a length of 5 μm or more.

4. The anode for the secondary battery according to claim 1, wherein each of the single-walled carbon nanotubes has a diameter of 1.2 to 2 nm.

5. The anode for the secondary battery according to claim 1, wherein the content of the first silicon-based active material is 5% by weight or more based on the total weight of the first anode active material layer, and the content of the second silicon-based active material is less than 5% by weight based on the total weight of the second anode active material layer.

6. The anode for the secondary battery according to claim 1, wherein a content of the multi-walled carbon nanotubes is 0.2 to 0.5% by weight based on the total weight of the second anode active material layer.

7. A secondary battery comprising:
the anode according to claim 1;
a cathode; and
a separation membrane disposed between the anode and the cathode.

* * * * *